United States Patent [19]

Becker

[11] Patent Number: 4,538,490
[45] Date of Patent: Sep. 3, 1985

[54] STAPLE FIBER CUTTER

[75] Inventor: Carol L. Becker, Charlotte, N.C.

[73] Assignee: Celanese Corporation, New York, N.Y.

[21] Appl. No.: 490,693

[22] Filed: May 2, 1983

[51] Int. Cl.³ .......................... B26D 1/36; B26D 1/40
[52] U.S. Cl. ........................................ 83/346; 83/663; 83/698; 83/913
[58] Field of Search ................. 83/346, 347, 663, 592, 83/698, 913

[56] References Cited

U.S. PATENT DOCUMENTS 3,744,361 7/1973 Van Doorn ........................... 83/346
3,915,042 10/1975 Laird ................................. 83/913 X
4,360,168 11/1982 Peterson ........................... 83/698 X

FOREIGN PATENT DOCUMENTS 2315171 10/1974 France .................................. 83/346

Primary Examiner—James M. Meister
Assistant Examiner—John L. Knoble
Attorney, Agent, or Firm—S. M. Bodenheimer, Jr.

[57] ABSTRACT

An improved apparatus is disclosed for cutting a tow of continuous filamentary material into staple fiber of mixed cut length, with some lengths being below ¾ inch and some lengths above ¾ inch. The improved cutter comprises asymmetric means for supporting at least the blades which cut the shortest filaments. It is preferred that the blade disposition within a quadrant of the cutting be similar to the blade disposition in the opposed quadrant. The apparatus facilitates cutting without blockage and/or blade breakage.

5 Claims, 14 Drawing Figures

FIGURE 7A
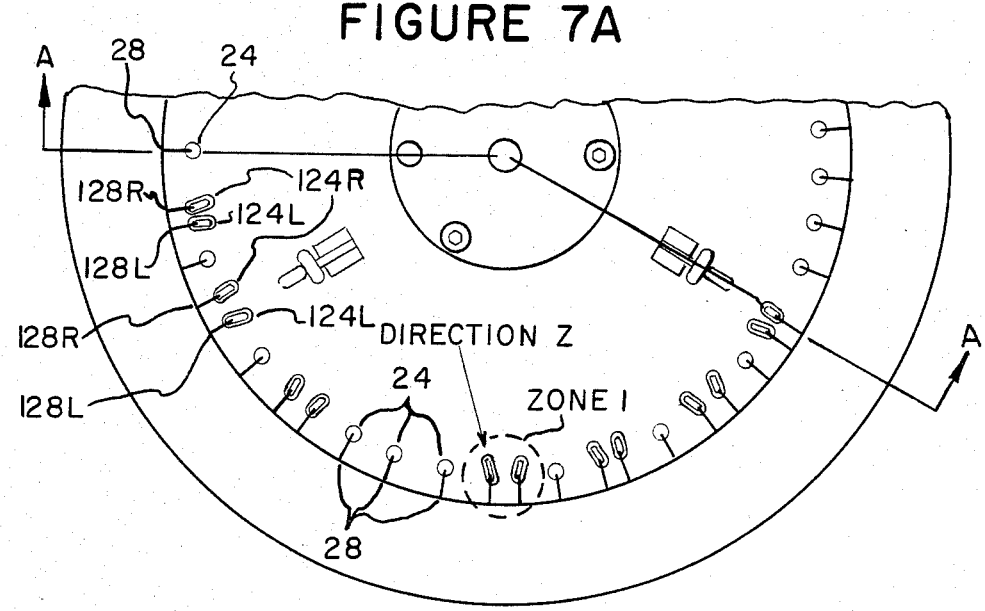
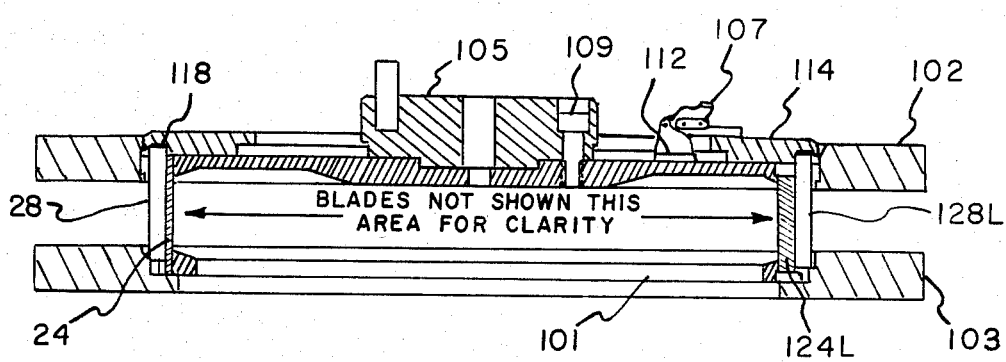
FIGURE 7B

STAPLE FIBER CUTTER

BACKGROUND

1. Field of the Invention

The invention relates broadly to an improved apparatus and process for cutting elongated material, such as filamentary tows, into predetermined lengths, such as staple fiber. More particularly, it relates to an improvement to the means for holding the plurality of knives that are used to cut staple fiber of mixed cut length, wherein some of the staple fiber has a length of less than ¾ inches. The holding means includes a support post to reduce blade breakage and contamination of the cut staple fiber.

2. Prior Art

Polyester staple fiber of mixed cut length, wherein some of the staple fiber has a length of less than ¾ inches, is old in the art. For example, see Canadian Pat. No. 1,137,368 which discloses such a product and process and apparatus for making it.

There is extensive prior art with regard to staple fiber cutters which apparatus includes (i) a plurality of blades; (ii) means for supporting and spacing the blades; (iii) means for continuously passing polyester continuous filamentary tow over the edges of the spaced blades; and (iv) means for applying pressure on the tow to force the tow against the edges of the blades, whereby the tow is cut into staple fiber and simultaneously forced through the blades and their supporting means. For example, see U.S. Pat. Nos. 3,485,120 (Keith); 3,915,042 (Laird 1); 4,006,277 (Laird 2); and 4,141,115 (Fourne et al) and the figures labelled Prior Art herein.

FIGS. 1–4 (Prior Art) of this application are essentially identical to FIGS. 1–4 of U.S. Pat. No. 3,485,120 (Keith), "Method and Apparatus for Cutting Elongated Material". With reference to these figures, U.S. Pat. No. 3,485,120 discloses an apparatus for cutting material such as filamentary tows (74) into predetermined lengths comprising (a) a cutting assembly (18) including a plurality of spaced apart knife (28) edges (3) secured to a mounting member (22) at equal radial distances from a point on said mounting member (22) thereby forming a reel (18), each of said radial distances in every instance being less than the distance from said point to the periphery of said mounting member (22); (b) said cutting assembly (18) having means adapted to receive successive wrappings of material to be cut (64) in contact with a plurality of said knife (28) edges (30) so that no relative movement occurs between said material and said knife (28) edges (30) longitudinally of said material; and (c) means for forcing said material between adjacent knife (28) edges (30) [presser or pressure roll (42)], thereby severing said material into lengths of controlled dimensions. The knife blades (28) are removably mounted or inserted in slots (26) in "connector lengths" (24), which provide support for the knife blades. A more detailed description will be found in U.S. Pat. No. 3,485,120, particularly columns 3 and 4.

In general with such staple fiber cutters, in order to cut tow into a multiple length distribution, the spacing between successive cutting surfaces may be incrementally increased and/or adjacent cutting surfaces may be oriented in a nonparallel orientation with respect to each other.

It is also known that the foregoing types of staple fiber cutter frequently pose problems when the product includes fiber having lengths less than ¾ inch. Three copending patent applications are addressed to the problems associated with cutting polyester tow into uniform fiber length of ½ inch. In particular, see application Ser. No. 06/343,241, filed Jan. 27, 1982 (Stikeleather et al); application Ser. No. 06/343,242, also filed Jan. 27, 1982 (Glick); and application Ser. No. 472,560, filed Mar. 7, 1983 (McLaughlin).

In addition, there has been public use for more than one year of cutters similar to those shown in FIGS. 1–4 (Prior Art), except that the knives (28) have been nonuniformly spaced in order to make mixed cut polyester staple fiber having length distributions shown in Canadian Pat. No. 1,137,368. However, asymmetrical support posts were not used (see Comparative Example 2 below).

In all the known prior art, each cutting blade has essentially been supported by support means that is completely symmetrical about the blade that is being supported. For example, FIG. 8 of U.S. Pat. No. 4,141,115 shows blades (44) supported by symmetrical slotted cylindrical rods (46).

SUMMARY OF THE INVENTION

In contrast to the forementioned prior art, it has now been surprisingly discovered that at least one pair of asymmetric means for supporting blades can greatly improve the cutting performance of cutters for making mixed cut fiber wherein the fiber has some lengths below ¾ inch and some lengths greater than ¾ inch. Pairs of asymmetric supporting means are used to support the pairs of blades that cut the fiber having lengths up to and including ¾ inch. Each of the asymetric support means comprises a slot for receiving and supporting a blade and the support means is asymmetrical about the slot.

THE DRAWINGS

FIG. 7A shows in partial plan view the relative disposition of some knife blades and their respective supporting means in a horizontal cutter reel according to the invention.

FIG. 7B is a cross-sectional view of FIG. 7A along A—A.

Figure 8A:
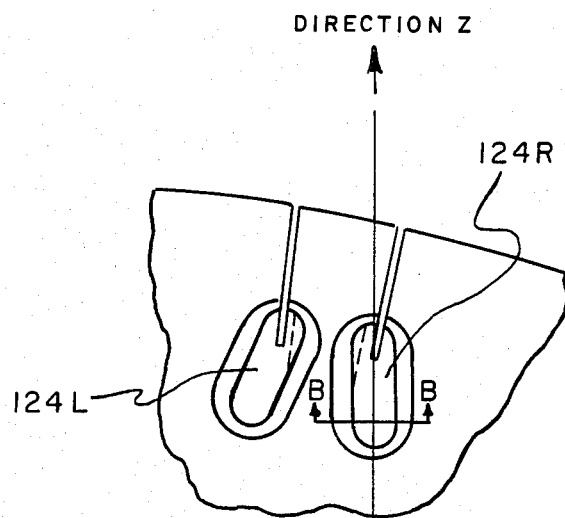
FIG. 8A is an enlarged view of Zone 1 of FIG. 7A.
Figure 8C:
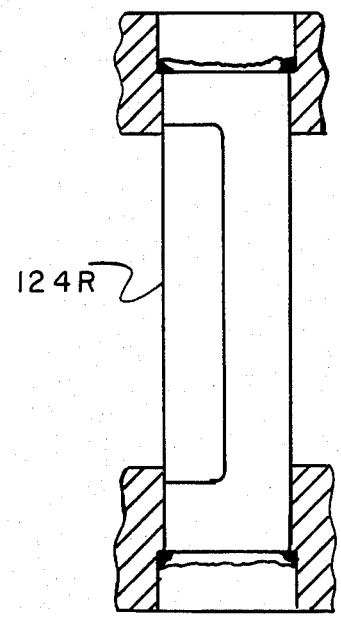
FIG. 8C is a view in side elevation cross-section of FIG. 8B along C—C.
Figure 8B:
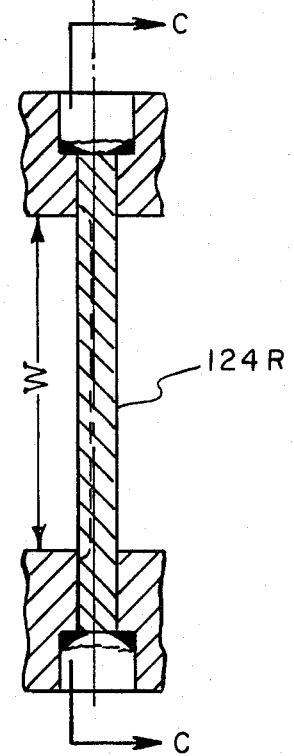
FIG. 8B is a partial view in front cross-section of FIG. 8A along B—B.
Figure 9A:
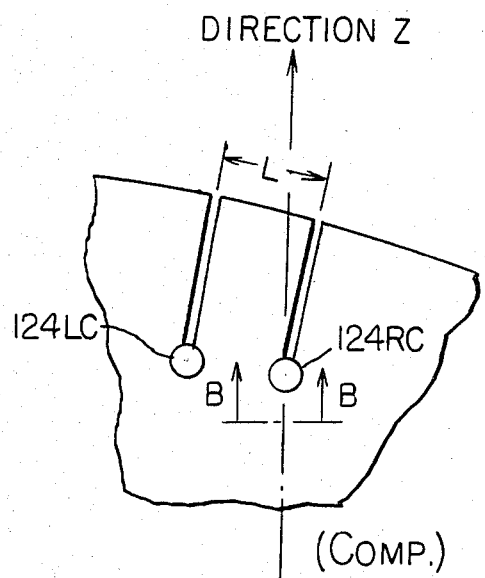
Figure 9B:
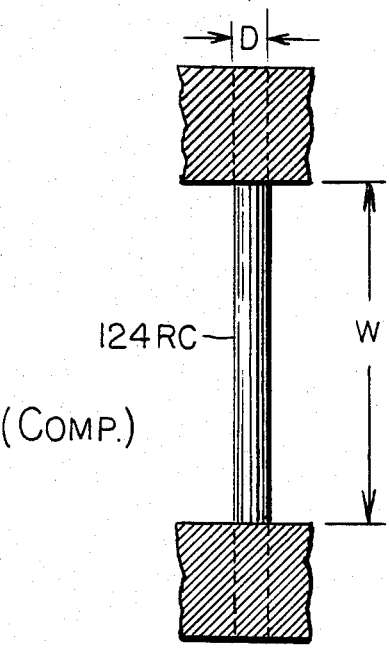

FIGS. 9A and 9B essentially correspond to FIGS. 8A and 8B, except that they relate to Comparative Examples 2–4 rather than to the invention.

DESCRIPTION OF THE PREFERRED EMBODIMENTS

In accordance with the invention there is provided an improved apparatus for cutting a tow of continuous filamentary material, such as crimped polyester tow, into staple fiber of mixed cut length, wherein the staple fiber includes first filaments having lengths less than ¾ of an inch and second filaments having lengths greater than ¾ of an inch. The apparatus includes (i) a plurality of blades; (ii) means for supporting and spacing the blades; (iii) means for continously passing the tow over the edges of the spaced blades; and (iv) means for applying pressure on the tow to force the tow against the blades whereby the tow is cut into staple fiber and simultaneously forced through the means for supporting and spacing the blades. The improvement according to the invention comprises at least one pair of asymetric means for supporting a pair of blades, each of the asymetric support means comprising a slot for receiving and supporting a blade, wherein the asymetric support means is asymetrical about the slot. Advantageously, the pair of asymetric support means, which comprises a first asymetric support means for a first blade and a second asymetric support means for a second blade, are arranged so that the second blade is adjacent to the first blade within the closest distance, L, of up to ¾ of an inch between the first blade's edge and second blade's edge, and so that the first and second asymetric support means have opposed asymetry from each other and most of each asymetric support is located outside a space between a first plane and a second plane, the first blade being in the first plane and the second blade being in the second plane.

The nature of the preferred embodiments of the invention is best understood by the Examples contrasted with the Comparative Examples hereinafter. Such Examples are not intended to limit the scope of the invention.

EXAMPLE 1

Figure 1:
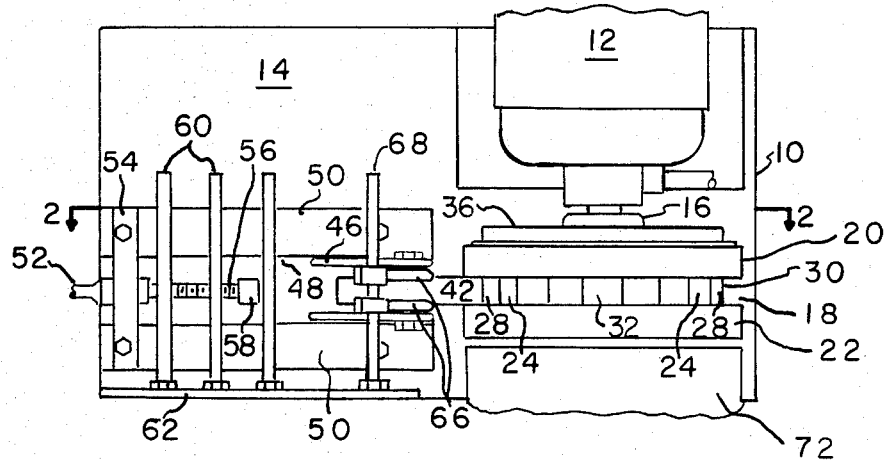
FIGS. 1–4 show prior art apparatus discussed above.
Figure 2:
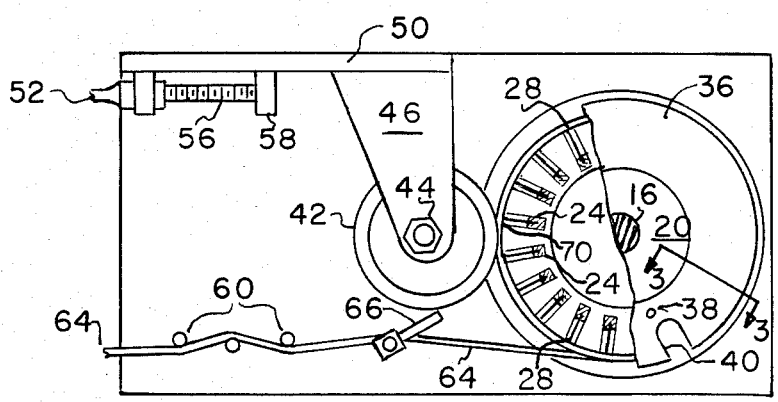
Figure 3:
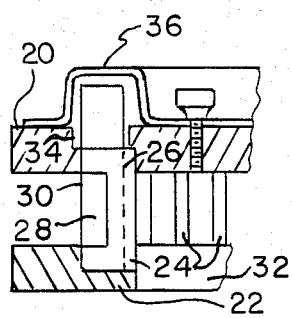
Figure 4:
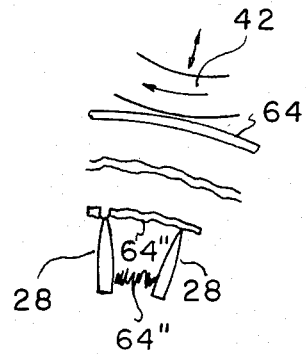
Figure 5A:
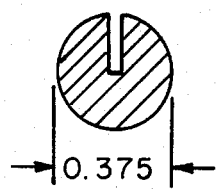
FIGS. 5A and 5B shows a cross-sectional view of typical symmetrical knife supporting means of the prior art, and correspond to an enlargement of so-called "connector lengths" (24) in FIG. 2 (Prior Art).
Figure 5B:
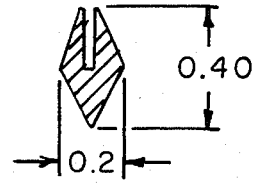

A staple fiber cutter of the general type shown in prior art FIGS. 1 and 2 was modified by replacing the cutter reel assembly (18) by a different cutter reel made in accordance with FIGS. 6, 7A, 7B, 8A, 8B and 8C. The modified cutter reel was capable of cutting mixed cut polyester staple fiber having a predetermined histogram of fiber length distribution, with cut lengths ranging from ½ to 1½ inches. An essential difference between this cutter and one that had been in public use for more than a year was the use of asymmetric blade supporting means on every pair of blades that cut the tow to a length of ¾ inch or less, as discussed in more detail below.

FIG. 7A is a partial plan view of the relative disposition of some knife blades (128L and 128R and 28) and their respective supporting means (124L or 124R or 24) in a cutter reel according to the invention. The blades are all positioned radially in the reel and the distance between adjacent blades, in quarter inches, is denoted by the numbers shown on FIG. 7A. In this Example, the edges of the blades all lay on a cylinder having a perimeter of about 54 inches. Fifty-one blades were consecutively spaced from the immediately preceding adjacent blade by the following distances in inches: 1¼; ¾; 1; 1; ½; 1½; 1¼; 1; 1¼; 1¼; 1¼; 1½; ½; 1; 1; ¾; 1¼; 1¼; ½; 1¼; 1; ¾; 1¼; 1¼; 1¼; 1¼; 3/3; 1¼; 1¼; ¾; 1; 1; ½; 1¼; 1¼; ¾; 1; 1¼; ½; 1¼; 1¼; ¾; 1; 1¼; 1½; 1¼; 1¼; ¾; 1; 1, ½; and 1¼.

As a result of the foregoing distribution of distances between adjacent blades, the theoretical fiber length number distribution from such a cutter is 7 at 1½": 18 at 1¼": 12 at 1": 8 at ¾": 6 at ½". This corresponds to a weight percent distribution for each length of 20 weight percent of 1½"; 41 weight percent of 1¼ inch; 22 weight percent of 1"; 11 weight percent of ¾"; and 6 weight percent of ½".

FIG. 7B is a cross-sectional view in front elevation of FIG. 7A along A13 A.

FIG. 8A is an enlarged and rotated view of Zone 1 of FIG. 7A. FIG. 8B is a partial view in front cross-section of FIG. 8A along B—B. FIG. 8C is a cross-section view in side elevation of FIG. 8B along C—C. Together, FIGS. 8A–8C show the structure of the pairs of asymmetric supporting means (124L and 124R) used to support the respective pairs of blades (128L and 128R). The dimension W in FIG. 8B corresponds to the effective blade width and was 1 11/16 inches.

Figure 6:
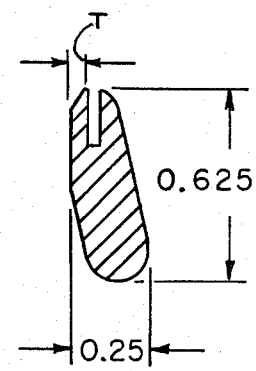
FIG. 6 shows a cross-sectional view of an asymmetrical knife supporting means of the invention, in contrast to Prior Art FIGS. 5A and 5B.

FIG. 6 is an enlarged cross-section of supporting means 124R at its center. The cross-section of supporting means 124L is a mirror image of the cross-section of supporting means 124R. The thickness, T, of the inner wall of the slot was 0.050 inches.

It should be noted that blades 128L, 128R and 28 are all identical to each other.

Fabrication technique is important in obtaining correctly dimensioned cutting reels. Since the support members are oval in shape, precise location on both members of the wheel is a difficult and precision exercise. In order to facilitate this, enlarged pockets on the outer surfaces are created to absorb any minor dimensional inaccuracies that would create assembly problems. The supporting means 124L and 124R are located in their respective holes and tackwelded to form a firm contiguous support. Only thereafter are machined the blade receiving slots and the inner flats on the support members.

The foregoing apparatus was used to cut crimped polyester continuous filament tow into staple fiber at a speed of about 450 feet/minute. The tow had a total denier of about 970,000 and about 700,000 filaments. The cutting performance was highly satisfactory without any significant clogging of the staple fiber, and without undue blade breakage.

EXAMPLE 2 (COMPARATIVE)

This is a Comparative Example. Fiber of mixed cut length was made in general accordance with Example 1, except that the apparatus conformed to FIGS. 9A and 9B, rather than FIGS. 8A–8C. Thus, support means 124LC and 124LC were used rather than support means 124L and 124R. Essentially, support means 124LC and 124RC were symmetrical circular rods which provided radial outwards support for blades 128L and 128R, respectively, in FIG. 7A. Both 124LC and 124RC had diameters, D, of 3/16 inch. Severe blockage of the staple fiber occurred in the regions between the pairs of blades used to cut the ½ inch fiber (corresponding to length L in FIG. 9A).

EXAMPLE 3 (COMPARATIVE)

Comparative Example 2 was repeated except that the supporting means 124LC and 124RC both had diameters, D, of ⅛ inch. Blade breakage problems occurred, particularly accompanied by failure of the supporting means 124LC and 124RC. This was true even when the supporting means were made from type 4130 steel.

EXAMPLE 4 (COMPARATIVE)

This Comparative Example relates to prior art by virtue of public use more than one year before this application was filed. Fiber of mixed cut length was made in general accordance with Comparative Example 2, except for (1) the complete absence of any supporting means 124LC or 124RC; and (2) the effective blade width (W in FIG. 9B) being ¾ inch rather than 1 11/16 inch. This elimination of half the supporting means resulted in a process that ran without undue blockage and only a few broken blades. However, the broken blades contaminated the final product. They could not be easily removed magnetically because of the large fiber mass. Further, it should be noted that the cutting capacity of this cutter was very much smaller than the capacity of the cutter in Example 1, because of the smaller value of effective blade width, W.

EXAMPLE 5 (COMPARATIVE)

Example 2 (Comparative) was repeated except that the apparatus did not contain any supporting members 124LC and 124RC and the blades 128L and 128R were merely supported in slits in the reel rims.

Blade breakage problems were encountered, which were aggravated by the absence of broken-blade detection equipment.

EXAMPLE 6

Example 1 was repeated except that the sequential cutting lengths were as follows in inches: ½; 1½; 1¼; ¾; 1¼; 1¼; ½; 1¼; 1; 1; ¾; 1; 1½; ½; 1¼; 1; 1; 1¼; ¾; 1¼; 1¼; 1¼; ¾; 1¼; 1; 1½; ½; 1½; 1¼; ¾; 1¼; 1¼; ½; 1¼1; 1; ¾; 1; 1½; ½; 1¼; 1¼; 1; ¾; 1¼; 1¼; 1; ¾; 1¼; 1 and 1½.

The purpose of the foregoing change was to attempt to ensure relatively even loading of the pressure roll (42 in FIG. 1). It will be noted that the disposition of the various lengths have been arranged so that opposing quadrants of the wheel have similar length dispositions.

Trials indicated that the blades were less prone to break than in Example 1.

The foregoing Examples illustrate the invention. However, it should also be noted that it is most preferred that each asymmetric blade support comprises a slot for supporting its respective blade in both circumferential directions, rather than merely in a radial direction. This circumferential support permits the effective blade width, W, to be increased (and therefore cutting capacity to be increased), without significantly increasing blade breakage.

It is further most preferred that the thickness of the wall of the slot that is closer to the adjacent asymmetric blade support have a thickness, T, within the range 0.040 to 0.070 inches (see FIG. 6). When the value of T is too low, blade breakage tends to increase. When the value of T is too high, fiber blockage tends to increase.

What we claim is:

1. Improved apparatus for cutting a tow of continous filamentary material, into staple fiber of mixed cut length, the staple fiber comprising first filaments having lengths less than three quarters of an inch and second filaments having lengths greater than three quarters of an inch, the apparatus including (i) a plurality of blades (ii) means for supporting and spacing the blades; (iii) means for continously passing the tow over the edges of the spaced blades; and (iv) means for applying pressure on the tow to force the tow against the edges of the blades whereby the tow is cut into staple fiber and simultaneously forced through the means for supporting and spacing the blades, wherein the improvement comprises at least one pair of asymetric means for supporting a pair of blades, each of said asymetric support means comprising a slot for receiving and supporting a blade, each of said asymetric support means being asymetrical about said slot.

2. The apparatus of claim 1 wherein said pair of asymetric support means comprises a first asymetric support means for a first blade and a second asymetric support means for a second blade that is adjacent to the first blade within a closest distance, L, of up to three quarters of an inch between the first blade's edge and the second blade's edge, wherein the first and second asymetric support means have opposed asymetry from each other, and wherein most of each asymetric support is located outside a space between a first plane and a second plane, the first blade being in the first plane and the second blade being in the second plane.

3. The apparatus of claim 2 which comprises a balanced reel wherein a quadrant of the reel comprises a blade disposition that is essentially similar to and opposed to the disposition of blades in the opposed quadrant.

4. The apparatus of claim 2 wherein each asymetric support means comprises and inner wall and an outer wall forming a slot therebetween, said formed slot being said slot for receiving and supporting a blade, wherein the inner wall has a thickness, T, within the range 0.40 to 0.70 inches.

5. The apparatus of claim 4 wherein the inner wall has a thickness, T, of about 0.50 inches.

* * * * *